3 Sheets—Sheet 1.
J. B. HERRON.
SODA WATER APPARATUS.
No. 11,313. Reissued Mar. 14, 1893.
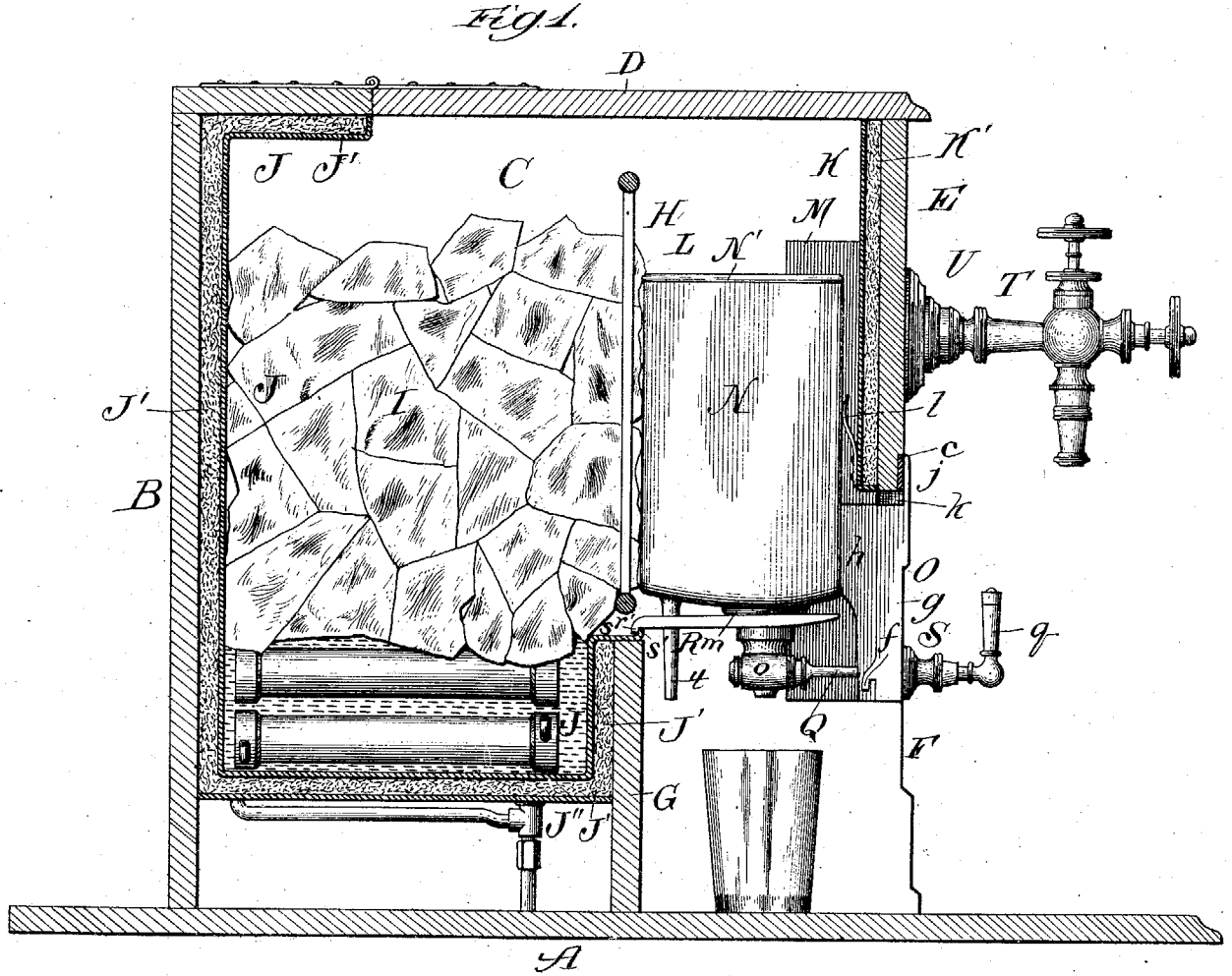
Witnesses:
Chas. E. Stuyford,
Clifford H. White.
Inventor.
James B. Herron,
By Bunning & Bunning & Payson,
Attys.

J. B. HERRON.

SODA WATER APPARATUS.

No. 11,313. Reissued Mar. 14, 1893.

Witnesses:
Chas. Gaylord
Clifford H. White.

Inventor:
James B. Herron.
By Banning & Banning & Payson,
Att'ys

3 Sheets—Sheet 3.

J. B. HERRON.

SODA WATER APPARATUS.

No. 11,313. Reissued Mar. 14, 1893.

Witnesses:
Chas. E. Gaylord.
Clifford H. White.

Inventor:
James B. Herron,
By Manning & Manning & Clayton,
Attys.

UNITED STATES PATENT OFFICE.

JAMES B. HERRON, OF CHICAGO, ILLINOIS, ASSIGNOR, BY MESNE ASSIGNMENTS, TO HARVEY S. PARK, OF SAME PLACE.

SODA-WATER APPARATUS.

SPECIFICATION forming part of Reissued Letters Patent No. 11,313, dated March 14, 1893.

Original No. 452,754, dated May 19, 1891. Application for reissue filed March 1, 1892. Serial No. 423,428.

*To all whom it may concern:*

Be it known that I, JAMES B. HERRON, a citizen of the United States, residing at Chicago, in the county of Cook and State of Illinois, have invented certain new and useful Improvements in Soda-Water Apparatus; and I do hereby declare that the following is a full, clear, and exact description of the invention, which will enable others skilled in the art to which it pertains to make and use the same, reference being had to the accompanying drawings, in which—

Figure 3:
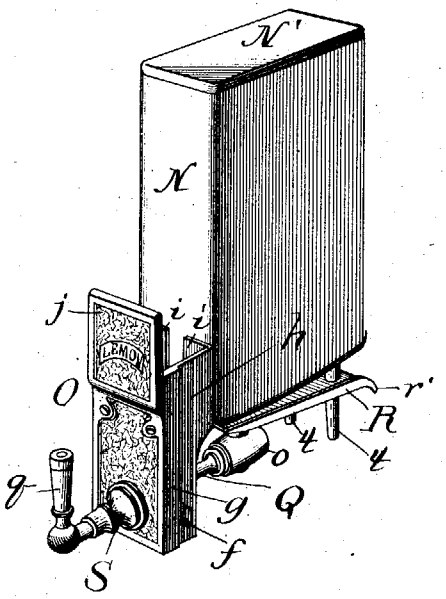
Figure 2:
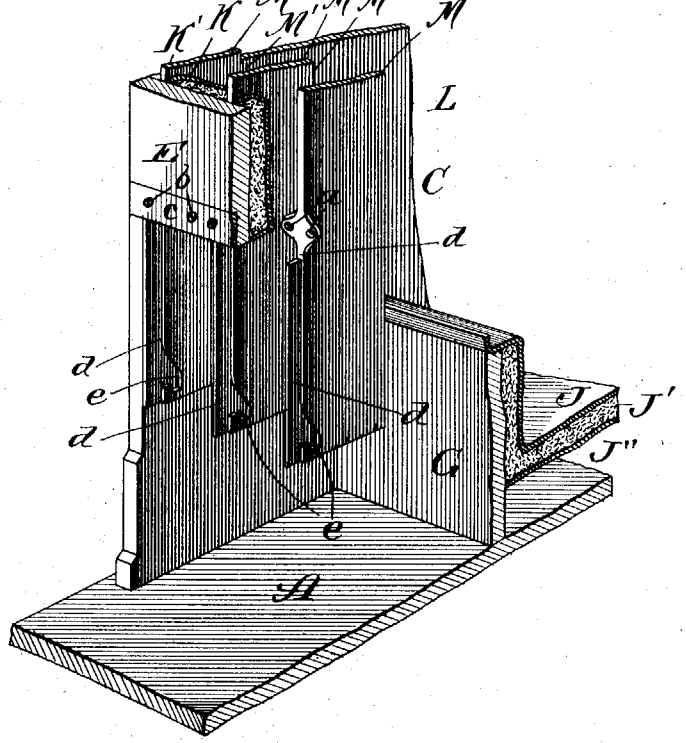
Figure 5:
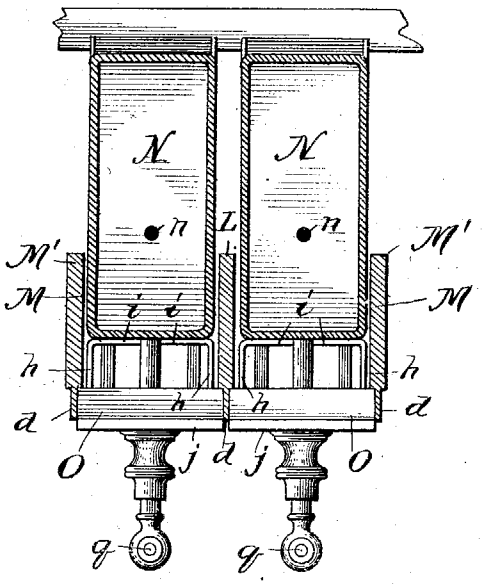
Figure 4:
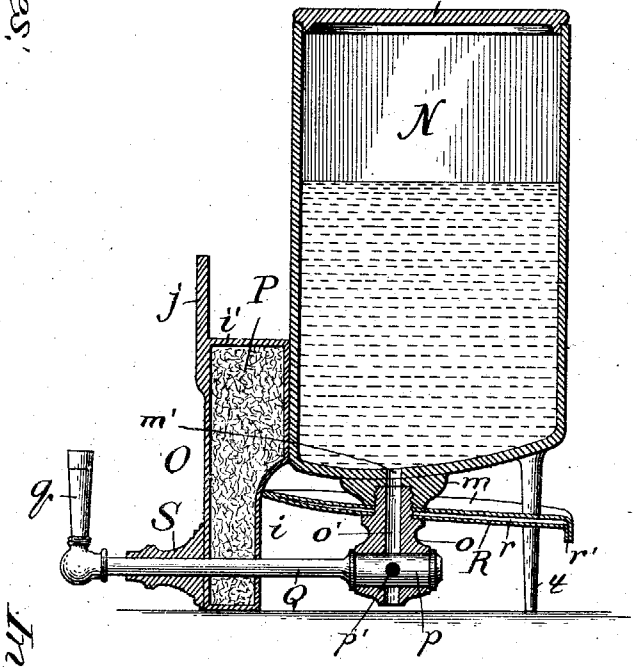

Figure 1 is a cross-section through the fountain, showing a can in elevation. Fig. 2 is a perspective sectional elevation showing the front of the fountain. Fig. 3 is a perspective view of a can and its attachments. Fig. 4 is sectional elevation of a can and its attachments. Fig. 5 is a horizontal section of two cans in position in the fountain.

There are now in use two well-recognized classes or forms of soda-water apparatus, one in which vertical sirup-cans are used and the other in which horizontal sirup-cans are used. The vertical sirup-cans are inserted neck downward through the top of the fountain and the horizontal cans are inserted by sliding them in and through the front of the fountain. The vertical cans possess the superior advantage of a free discharge of the sirup, and the horizontal cans possess the advantage of easy insertion and removal. The insertion and removal of the vertical cans are attended with the disadvantage of having to use a step-ladder in order to get at the cans and the removal of objects placed in the top of the fountain for ornamentation or other purpose, and the use of the horizontal cans is attended with the disadvantage of slow discharge of the sirup and the liability of clogging the discharge.

The object of the present invention is to construct a soda-water apparatus having all the advantages of both the vertical can and the horizontal can without the disadvantages of either construction, to prevent the sweating of the fountain, to improve the construction of the sirup-chamber in the fountain, to improve the sirup-can and its attachment, and to improve generally the construction and operation of the fountain as a whole.

In the drawings, A represents the slab for the bottom of the fountain.

B is the back of the fountain.

C are the two ends of the fountain.

D is the top of the fountain, the front portion of which is hinged so as to be raised for access to the interior and the insertion of ice in the ice chamber.

E is the front of the fountain, extending only part way down.

F is an opening at the front of the fountain, between the front E and the bottom A, which opening is of a height to allow a can standing vertical to slide under the front E.

G is a backing for the open front of the fountain extending up from the bottom A.

H is a guard between the ice chamber and the can chamber, which guard is formed of an upper and lower horizontal rod and a series of vertical rods, and is for the purpose of permitting the ice to lie close to the sirup-cans without danger of breaking the cans, either in packing the ice in its chamber or the dropping of the ice from melting.

I is the ice-chamber.

J is a metallic lining extending from the backing G across the bottom of the ice-chamber, up the back B, and over the stationary part of the top D, so as to leave a space J′, and the space J′ is formed at the bottom of the ice-chamber I by a bottom J″ of metal, as shown in Fig. 1. The space J′ is to be filled with any suitable non-conducting material, such as mineral fiber, charcoal, &c., and this space J′ is also formed at the ends of the ice-chamber adjacent to the ends C of the fountain, and is for the purpose of preventing the chill of the ice-chamber penetrating to the walls of the fountain and causing sweating on the outside of the fountain-walls.

K is a metal lining for the front E, between which and the front E is a space K′, also filled with a non-conducting material, by which the outside of the front E will be kept from sweating.

L is the chamber for the sirup-cups in front of the ice-chamber.

M are partitions separating the front of the can-chamber L into compartments M′, each compartment M′ corresponding in width to the thickness of the can. The front edge of each partition M has on each side ears *a*, into which enter screws *b*, which screws pass through a metal strip *c* on the outer face of the front E and secure the partitions M to the front E. Each partition M at its front edge has a strip or tongue *d*, and in each side face of the intermediate partitions, adjacent to the strip or tongue *d* at the lower end, is a recess *e*, and a recess *e* is formed in the two end partitions on the inner face, as shown in Fig. 2.

N is the sirup-can, one for each compartment M′. As shown, these cans stand vertical in the can-chamber I, and each can is provided with a cover N′ and has a discharge hole *n* at its bottom or lower end, which hole *n* coincides with a hole in a cap *m*, firmly secured to the bottom of the can, and this cap *m* is made of vulcanized rubber and receives a plug *o*, made of vulcanized rubber, in which is a hole *o*′, coinciding with the hole in the cap *m*, and the hole *n* of the can-bottom, through which plug *o* the sirup is drawn from the can.

O is the can-support for each can N. This support has a front wall, the outer face of which can be left plain or have an ornamental design or designs, two side walls and a rear wall, and on each side is formed a hook *f*, projecting out and down from the shoulder *g* of the side wall *h*, and the side wall *h* is continued from the shoulder *g* and turned at right angles to form the back wall *i* in the construction shown in Fig. 3, and this wall *i* is firmly attached to the wall of the can, securing the support rigidly to the front of its can. The front wall of the support O has an upwardly-extending portion or plate *j*, which, when the can is in place, overlaps the lower edge of the front E, as shown in Fig. 1, and the plate *j* can have thereon the name of the sirup contained in the can, and when the can N is in place the hook *f* on each side enters the opening or recess *e* therefor in the side of the partition M, as shown in Fig. 1, and is locked and held in position by gravity. The support O is attached to its can to have a space *k* between its top and the bottom edge of the front E when the can is in place, and this space is sufficient to allow the can to be raised far enough for the hooks *f* to enter the recesses *e*, and, as shown, each can N when in place is held against forward tipping at its upper end by a spring *l*, one end of which is secured to the lining K in each compartment M′ for its free end to bear against the can, as shown in Fig. 1; but this spring *l* is not an absolute necessity, as the can will be held vertical by the locking-hooks *f*, which, being at the lower front corners, naturally tend to hold the can against forward tipping at the top.

P is a chamber formed in each support O by the front, side, and back walls of such support, which chamber P is to be filled with a non-conducting material to prevent the support from sweating on the front face of the outer wall. As shown in Fig. 4, the chamber P is wholly inclosed, a top *i*′ extending from the plate *j* to the back wall *i*, which is a continuous wall, while, as shown in Fig. 3, the top of the chamber P is open and the back wall *i* is divided where joined to the can-body.

Q is a stem for the valve controlling the discharge of the sirup from the can, which stem is operated by a handle *q*, and its valve *p* enters the plug *o*, and has an opening *p*′, which by turning the valve opens the discharge *o*′ for the sirup to pass from the can, as usual.

R is a receptacle for each can, attached to the can between the cap *m* and plug *o*, as shown in Fig. 4. Each receptacle is formed of an upper and lower plate, between which is a space *r* to receive a non-conducting material and prevent the bottom of the receptacle from sweating on the outside. The receptacle R receives the drip from its can and is of a dish shape on its upper face, with a rearward slope, and its rear edge has a lip *r*′, which when the can is in place overhangs a lip or flange *s*′, formed by turning up the edge of the lining J, in the construction shown at the front edge of the backing G, and this lining J on top of the backing G forms a shelf *s*, on which the drip is deposited from the several receptacles to run into the bottom of the ice-chamber I. Each can N at its rear side is provided with a leg or legs *t*, on which the can rests when down, and such leg or legs *t* pass through the receptacle R and form, with the end of the support O, a means for holding the can vertically while being filled and so that the can is held vertical without the use of the hand.

S is a rosette for encircling each stem Q adjacent to the front of each support O. This rosette is of the ordinary construction, as shown in Figs. 1, 3 and 4.

T is a draft for the soda or other water, which draft is of the usual construction and operates in the usual manner of the draft shown.

U is a rosette for receiving each draft-tube adjacent to the front E, and such rosette (shown in Fig. 1) is of the ordinary construction.

The can N has its support O attached to its front side by the wall *i*, and the drip-receptacle R is attached to the can N by the plug *o*, and with the support O and receptacle R attached the can is ready for use. The sirup is placed in the can by removing the cap or cover N′, and while being filled the can is held upright by the support O and leg or legs *t*, and in filling the plug *p* is turned in the position shown in Fig. 4, closing the discharge from the can. After being filled, the can is slipped into the opening F at the front of the fountain to be in line with the compartment M′, into which the can is to be placed, and for the purpose of slipping the can into place beneath the compartment, the height of the opening F is a little more than that of the can, so as to allow the can to pass readily and easily. The can, when in line with its compartment M′, is raised vertically into such compartment, and such vertical raising continues until the top of the support O is in contact, or nearly so, with the bottom of the front E, at which time the hooks *f* are in position to enter the openings or recesses *e* by pushing the can inward at its bottom, and when the hooks have entered the can is dropped, forcing the hooks *f* down and into engagement with their recesses *e* by the weight of the can and the force of gravity. The raising of the can to engage the hooks also raises the lip *r′* above the lip or flange *s′*, so that when the can is pushed in at the bottom the lip *r′* will be carried in and by the dropping of the can overhang the lip or flange *s′*. The can will be thus inserted in a vertical position, and when inserted will be locked and held in a vertical position for the sirup to escape at the hole *n*, and in escaping have the pressure of the contents of the can to assist the discharge. The can is readily and quickly removed for refilling or other purposes. To do which all that is required is to raise it until the hooks *f* are clear of the locking part of the recesses which also raises the lip *r′* above the lip *s′*, when by pulling the bottom of the can outward the can can be drawn down until its support O and leg or legs *t* rest on the base A, when the can is in position to be pulled out through the front opening F clear of the fountain, and the can is replaced in the manner described for inserting the can.

Each can is inserted and removed independent of the other cans, and when in its compartment the side of the shoulder *g* is in contact with the side of the tongue or strip *d*, and the edge of the shoulder *g* is against the edge of the partition M, with the side of the wall *h* against the partition, so that air cannot pass up between the support O and its partitions M. The receptacles R, when the cans are in position, overlap at their rear ends the lip or flange *s′*, and the sides of each receptacle lie against the side of the adjoining receptacle on each side, making a continued surface and preventing the entrance of air from the under side into the can-chamber to any great extent, forming in effect an air-tight chamber for the cans, and the admission of air at the top of the holders O is prevented by the contact of the plates *j* with the outer face of the front E when the cans are in place.

The sweating of the fountain on the outside is prevented by the non-conducting material in the spaces J′ K′, and the sweating of the outer surface of the holders is prevented by the non-conducting filling in the chamber P, so that the fountain as a whole cannot accumulate moisture on the outside, and moisture cannot gather on the under side of the receptacle R by reason of the non-conducting filling in the space *r′*, the result being a fountain which is practically moisture-proof at all points, and this feature of non-producing of moisture is very desirable and important, as it enables the fountain to be kept dry and clean-looking without any trouble and expense.

The opening at the lower portion of the front of the fountain in connection with a can-support enables a vertical can to be used and inserted from the front of the fountain, thus giving the full benefits and advantages of a vertical can in discharging the sirup, and at the same time giving the full benefits and advantages of a can which can be inserted and withdrawn at the front of the fountain, so that all the benefits and advantages of a vertical can and a withdrawal of a can at the front of the fountain are obtained in one fountain.

The holder O, as shown, is attached to its can; but the holder could be made removable from the can, in which case in inserting the can, the can would be first slipped into place and there locked by attaching the holder in place, and in removing the can the holder would have to be first detached and then the can dropped down and pulled out at the front. The hooks *f*, instead of being on the holder, could be on the partitions, and the holder would then have the recesses, the hooks in such case standing upward instead of downward, and the form of the holder and manner of attaching to the can could be varied, as well as the shape of the can in cross-section, without departing from the spirit of the invention, which consists, essentially, in having an opening at the front of the fountain for the passage of a vertical can and raising and retaining such can in a vertical position in the can-chamber.

As will be seen, one part of my invention consists in providing an elevated can-chamber adapted to receive a sirup can from below; and as to this feature it is immaterial whether the cans themselves be vertical inclined or horizontal. In other words, one part of my invention contemplates raising the cans and retaining them in position above their point of insertion, and this without regard to the form of the cans themselves—the only essential thing in this respect being that the cans shall be capable of insertion from below, and of being afterward raised and held in fixed position above the bottom as desired. Inserting the can from below and raising and holding it in fixed position above the bottom, being an essential feature of my invention, it will be understood that I do not in all cases intend to limit myself to minor or detail features, or to the use of cans of any particular form or construction.

What I claim as new, and desire to secure by Letters Patent, is—

1. In a soda-water fountain, an elevated can-chamber adapted to receive a sirup-can from below and mechanism for holding the can in position above the bottom, substantially as and for the purposes specified.

2. In a soda-water fountain, the combination of an elevated can-chamber receiving a sirup-can from below, a front for such chamber, an opening below the front and extending beneath the can-chamber, a sirup-can adapted to enter the opening at the front, and a support for the can when raised for inserting, raising, and holding a sirup-can from below into its chamber at the front of the fountain, and above the bottom substantially as and for the purposes specified.

3. The combination, in a soda-water fountain, of a chamber receiving a sirup-can from below, an open front for such chamber, a sirup-can inserted through the open front and raised to position from below, a support attached to the can, and a lock for the support when raised for holding the can in its raised position, above the bottom substantially as and for the purposes specified.

4. The combination, in a soda-water fountain, of a vertical sirup-can, a support for such can having on each side wall a locking hook, and a can compartment having on each side a partition with locking recesses receiving the locking hooks of the can support, substantially as and for the purposes specified.

5. The combination, in a soda-water fountain, of an open front, a vertical sirup-can, a support for such can having on each side a locking hook, and a can compartment having on each side a partition with a locking recess in its side, substantially as and for the purposes specified.

6. The combination, in a soda-water fountain, of a vertical sirup-can inserted from below and raised vertically at the front of a fountain, a support attached to the lower end of such can, a lock for the support when raised, and a spring located to bear against the front face of the sirup-can when in its raised position and prevent the forward tipping of such can, substantially as specified.

7. The combination, in a soda-water fountain, of an elevated can receiving chamber, a front for such chamber, an opening below the front and extending beneath the can chamber for the passage of a vertical sirup-can to be raised into its chamber from below, a vertical sirup-can, a support attached to the can at the lower end, and a front plate for the support having an upward extension to overlap the lower edge of the front, when the can is dropped into place, for closing the space between the top of the support and the lower edge of the front provided for the admission of the can, substantially as specified.

8. The front E, in combination with the partitions M, each having sides, projecting ears *a*, screws *b*, entering the ears *a* and metallic strips *c*, located on the outer face of the front E, for attaching the partitions to the front to form separate compartments, substantially as and for the purposes specified.

9. The partitions M, having the strips *d* and recesses *e*, in combination with a vertical sirup-can N, and the holder O, having the locking hooks *f*, shoulders *g*, and side walls *h*, substantially as and for the purposes specified.

10. The wall E, closing the front side of an elevated can-chamber, and an opening F below the wall E and extending beneath the can-chamber, in combination with the vertical sirup-can N and holder O, attached to the lower end of the vertical sirup-can and having a front plate *j*, with an upward extension to overlap the lower edge of the front E, when the vertical sirup-can is in place in its chamber, for closing the opening between the lower edge of the wall E and the can-holder O, substantially as specified.

11. The front E, opening F, and partitions M, forming a series of compartments M′, in combination with a series of vertical cans N, having each a holder O for inserting and withdrawing the cans vertically at the front of a soda-water fountain, substantially as and for the purposes specified.

12. The vertical can N, in combination with the holder O, having the chamber P for filling of non-conducting material, substantially as and for the purposes specified.

13. The holder O, having a front wall, a locking hook *f*, a shoulder *g*, and a side wall *h* on each side, and a rear wall *i* for attachment to a vertical can, substantially as and for the purposes specified.

14. The partitions M, each having a recess *e* in its side face, and spring *l*, in combination with the vertical can N and holder O, having in each side a hook *f* substantially as and for the purposes specified.

JAMES B. HERRON.

Witnesses:
EPHRAIM BANNING,
SAMUEL E. HIBBEN.